3,578,657
ANTILIPAEMIC SULPHATED POLYSACCHARIDE
René Ricard, Jesus y Maria 27, and Miguel Margarit
 Tayá, Manuel Girona 56, both of Barcelona, Spain
No Drawing. Filed July 29, 1968, Ser. No. 748,204
Claims priority, application Spain, Aug. 9, 1967,
343,957
Int. Cl. C07c 69/32
U.S. Cl. 260—234                                    4 Claims

ABSTRACT OF THE DISCLOSURE

An antilipaemic sulphated polysaccharide active under oral administration, which consists of a salt, preferably an alkaline salt, of a sulphated hydrodextran, with an average content of from 1 to 3 —$SO_3$— groups per monosaccharide groups and being essentially non-reducing as determined by the Somogyi method, having preferably an intrinsic viscosity of between 0.02 and 0.07 at 25° C. and containing a proportion of sulphur of from 10 to 20% by weight.

---

The present invention relates to a new antilipaemic sulphated polysaccharide which is active under oral administration.

The sulphated polysaccharides (heparinoids) are known to possess the property of increasing the anticoagulant capacity of blood when administered parenterally and to cause the disappearance of the fats found in dispersion in blood serum. This property appears to be characteristic of high linear polymers receiving negative electrical charges during conversion into the sulphate. Among the said sulphated polysaccharides, dextran sulphate is particularly well known.

The antilipaemic activity is based on the stimulus to release a lipoproteinlipase (expressed in terms of clarifying factor (C.F.)) and is a function of the molecular weight of the dextran and of the degree of sulphatation. Molecular weights lower than 1200 result in inactive products, whereas molecular weights higher than 20,000 result in products which are toxic under parenteral administration. The molecular weight is a function of the intrinsic viscosity, which should, therefore, lie between 0.02 and 0.07.

To obtain the appropriate molecular weights, the process usually used consists in the hydrolysis of dextran in an acid medium or in an oxidising, thermic, enzymatic or other suitable medium. The degree of sulphatation should suitably be maintained between 10 and 20% of sulphur in its potassium salt, i. e., equivalent to from 1 to 3 —$SO_3$— groups to each monosaccharide group. The known synthesis of sulphated dextran comprises sulphonating dextran with chlorosulphonic acid or sulphur trioxide in an organic medium, such as a pyridine, a picolines (either alone or dissolved in formamide), or the like, whilst keeping the reaction temperature at approximately 60° C. for a number of hours. After cooling, neutralizing and dialyzing, the sulphated dextran is precipitated with organic solvents. A variety of salts of the sulphated dextran so produced may be employed: e.g. sodium salts, potassium salts, ammonium salts, as well as alkyl and oxyalkylamine salts, and salts of other organic bases.

These heparinoid sulphated polysaccharides characteristically cause the release of lipoproteinlipase on penetrating into the blood stream of a living animal. This release of lipoproteinlipase may be observed by the reduction in turbidity occurring on mixing 2 cc. of citrated plasma extracted 10 minutes after injecting heparin, or two hours after injecting the heparinoid sulphated polysaccharide intravenously, in a dosage of 2 to 4 mg. per kg. with 0.1 to 0.2 cc. of a freshly prepared 5% suspension of Ediol (trade name of Schenlabs Pharmaceutical). The optical densities are determined with a red filter before mixing and after 15 and 30 minutes following preparation of the mixture. The mixture is kept at 37° C. in 1 cm. test tubes.

The antilipaemic capacity of these heparinoid sulphated polysaccharides, in comparison with that of heparin, is shown in Table I which gives values of optical densities:

TABLE I

| Dose | | Sulphated polysaccharide | |
|---|---|---|---|
| | 3.5 mg./kg. | 2.5 mg./kg. | 3 mg./kg. |
| Time (minutes): | | | |
| 0 | 0.540 | 0.545 | 0.535 |
| 15 | 0.450 | 0.360 | 0.305 |
| 30 | 0.370 | 0.295 | 0.265 |

Parenteral administration of the product has the disadvantage of the inconvenience of administering a product whose activity lasts for 6 hours and which should logically be administered at least twice daily.

It was found moreover that oral administration is not very effective as the product is absorbed or altered in the digestive tract. This problem has been partially overcome by simultaneously administering calcium or magnesium complexing agents, or by coating the product to protect it against gastric juices.

Oral absorption can be determined by measuring the increase in the concentration of fatty acids released at the expense of triglycerides, after a greasy meal, taking blood samples at different times before and after imbibing the composition. It is possible to perform this determination according to the method of Dole and Kern (J. Lipid. Research, 2, 51, 1961), expressing the results in micromols of fatty acids per cc. of serum. The normal figures are of the order of 0.4 to 0.7 micromol, although there are known sulphated dextrans which, without the addition of complexants or coating, raise the fatty acid content to from 1 to 1.2 micromols per cc., when taken at a dosage of 150 mg.

The novel sulphated polysaccharide of the present invention makes it possible to increase the said fatty acid content to from 2 to 3 micromols per cc. when taken at a dosage of 150 mg.

The present invention consists in a sulphated polysaccharide which is a salt of sulphated hydrodextran having a sulphur content to from 1 to 3 mol per monosaccharide group, and being substantially non-reducing as determined by the Somogyi method. Its intrinsic viscosity at 25° C. preferably lies between 0.02 and 0.07.

The general scope of the invention covers all the pharmaceutically acceptable salts. Alkaline salts having a sulphur content of 10 to 20% of the total weight, are of special interest.

The products of the present invention may be obtained by sulphonating a hydrodextran, preferably having an intrinsic viscosity of between 0.02 and 0.07 at 25° C., and possessing a reducing capacity as determined by the Somogyi method lower than 0.5% expressed in glucose. Dextran is a polymer of glucose, with a majority of —1–6–1–6— bonds, such that the last cycle of the chain is a glucose unit possessing a pyranose ring formed by an oxygen bridge in the enolic form of the aldehyde in the 6th carbon position. This ring is of a reducing nature with respect to alkaline cupric solutions (Fehling, Somogyi & ors.). The reducing power of the dextran employed lies between one tenth and one twentieth of that of glucose.

During the hydrogenation of dextran, the final reducing ring of the chain is converted into a polyol, so that the reducing power of hydrodextran is practically negligible (approximately 0.5% of that of glucose). During sulphonation of dextran, the enolic hydroxide of the 6th carbon atom in the final link of the chain is also sulphated, so that the differences in reducing power compared to hydrodextran are reduced considerably.

Moreover, applying the Somogyi method, it has been found that 50 mg. of glucose have the same reducing power as 25 grammes or less of sulphated dextran, and as 60 grammes or more of sulphated hydrodextran.

Hydrodextran is produced by hydrogenation of a dextran, suitable possessing an intrinsic viscosity of between 0.02 and 0.07 at 25° C. (approximately equivalent to a molecular weight of between 1500 and 3500). The hydrogenation may be effected by an electrolytic process using sodium or potassium amalgam in which mercury acts as a cathode, or by using sodium borohydride in aqueous solution from which hydrodextran is recovered after deionisation with ion exchanger resins, or else by direct hydrogenation in the presence of catalytic nickel, or by other conventional physico-chemical processes.

Once it has been sulphated by any of the processes applicable to dextran and other polysaccharides, hydrodextran will form salts, the most common being those of potassium and of sodium. Salts may also be formed with various organic bases, such as diethylamine, monoethylamine, and the like, or with pyridoxine, thiamine, and the like.

The differences in activity, as shown by the capacity to release lipasic units, between the potassium salt of sulphated dextran and the potassium salt of sulphated dextran and the potassium salt of sulphated hydrodextran, are apparent from the following Table II. The values in the second and third columns were determined by the Dole and Kern method and represent the average of lipasic units (micromols of fatty acids per cc. of serum) of two groups of 4 persons who had received 150 mg. of medication per person and per dose, together with fatty food amounting to 900 Kcal. Blood samples were taken before administration of the medication and 1, 2, 4 and 6 hours after administration.

TABLE II

| | Lipasic units | | | | |
|---|---|---|---|---|---|
| Hours | 0 | 1 | 2 | 4 | 6 |
| Potassium salt of sulphated dextran | 0.55 | 1.10 | 1.12 | 0.9 | 0.68 |
| Potassium salt of sulphated hydrodextran | 0.43 | 2.37 | 2.11 | 0.85 | 0.89 |

Appreciable differences are also observed in anticoagulant property by evaluation in vitro according to the method of Marvin H. Knizenga (J. Biol. Chem., 139, 612) employing sheeps' blood. 1 mg. of the potassium salt of sulphated dextran has 12 International Units of anticoagulant activity, its intrinsic viscosity is between 0.04 and 0.07 and its sulphur content is from 14 to 16%, whereas the potassium salt of sulphated hydrodextran possessing the same viscosity and proportion of sulphur, exhibits no more than 6 International Units of activity.

The invention is now further illustrated with reference to the following non-limiting examples.

EXAMPLE 1

225 litres of water were placed into a vessel equipped with a reflux system and a stirring mechanism, and the temperature was raised to boiling point. 15 kilogrammes of dextran, having a molecular weight of 250,000, and 15 litres of 1 N $H_2SO_4$, were then added. Boiling was continued for a number of hours, whilst the relative viscosity at 25° C. was checked at regular intervals until it reached the value of 1.3 Neutralisation was then effected with 1.5 litres of 10 N NaOH. The mixture was then cooled and 225 litres of acetone were added. The batch was allowed to stand for 24 hours, and the dextran content was precipitated from the clear decanted part, by means of another batch of 225 litres of acetone. The precipitate obtained was dissolved in 50 litres of water and dialysed for 24 hours. The liquids obtained were then concentrated down to 200 litres, and the dextran was precipitated by means of 400 litres of isopropyl alcohol.

The precipitate obtained contained approximately 4 kg. of dry dextran, having an intrinsic viscosity at 25° C. of 0.05 and a reducing power equivalent to 7% of glucose, as determined by the Somogyi method.

The dextran obtained was then dissolved in the proportion of 20% in water, and was hydrogenated. In order to effect the hydrogenation, 20 litres of this dextran solution was made alkaline by the addition of a 40% (by volume) solution of NaOH and placed in the cationic region of a cell with a mercury cathode possessing a surface area of approximately 4 dm.$^2$. A 10% solution of sodium sulphate was placed in a porous vessel of capacity 500 cc. The anode was a platinum rod, of length of 15 cm. and diameter 2.5 mm. A current of approximately 10 amps was passed through the solution which was cooled. A stirrer maintained constant agitation throughout the solution. Samples were taken periodically to determine the reducing capacity; when this latter reached a value at which one cc. was equivalent to 1 mg. of glucose, the reduction was considered to have been complete. After filtering the solution, its alkalinity was eliminated by means of cationic Lewatite S–100 resin (trade name of Bayer A.G.) and the pH thus adjusted to between 6.5 and 7.0. Precipitation was then performed with twice its volume of alcohol, the solution being allowed to stand for two days. The superjacent liquid was decanted, the precipitate collected and dried, and 2.5 kg. of hydrodextran were obtained possessing the following characteristics: ash content 6.7%, reducing capacity being of such order that 20 g. is equivalent to 50 mg. of glucose, rotatory power (alpha) of +185°, and intrinsic viscosity 0.04.

The hydrodextran obtained was sulphonated by the following method, 8 litres of pyridine were charged into a 20 litres capacity vessel, equipped with a stirring mechanism and a waterbath. 1.8 litres of chlorosulphonic acid were then added dropwise. When the reaction had reached completion 1.6 kg. of hydrodextran were poured in with stirring. The temperature was kept at 65° C. for 12 hours, after which the mixture was cooled. Whilst cooling and stirring, 3.3 litres of 70% (by volume) caustic soda were added. The solution was then allowed to stand, and the superjacent pyridinic portion decanted. The residue was dissolved in 20 litres of water, clarification being obtained by adding 4 litres of sodium hypochlorite. The temperature was maintained at 37° C., and 20 litres of alcohol were added. The whole was allowed to stand, and 16 litres of water were added. The pH value was maintained at 9 until pyridine precipitation was complete. Finally, the solution was dialysed, the sodium salt of sulphated hydrodextran being precipitated with solvents. Approximately 3 kg. of product were obtained by drying. By injecting 2 mg./kg. of body weight into rabbits, a plasma was obtained after two hours which was mixed with Ediol at 5% (0.1 cc. of Ediol in 2 cc. of plasma). The optical density in 1 cm. test tubes dropped to approximately 0.5 in 15 minutes, after being kept at 37° C.

The physico-chemical characteristics of the sodium salt of sulphated hydrodextran are:

Ash content—38.7%
Hydrodextran—39.5%
Sulphur—14.9%
Rotatory power (alpha)—+81°
Quantity having the same reducing power as
    50 mg. of glucose—63.4 g.
Intrinsic viscosity—0.07

EXAMPLE 2

8 kg. of dextran, of molecular weight 100,000, was dissolved in 45 litres of boiling water. After cooling, 4 litres of 100 volume hydrogen peroxide were added. The solution was then placed in an environment at between 35 and 40° C., producing progressive depolymerisation of the product. It was necessary to periodically neutralize the solution as it gradually became acid during this process. When the intrinsic viscosity reached a value of 2.5 at 25° C., the solution was neutralized and the dextran precipitated with twice its volume of 96% alcohol, obtaining a dry weight of approximately 5 kg. of dextran, of intrinsic viscosity 0.06 and a reducing power, determined by the method of Somogyi of 9% of glucose.

An aqueous 20% solution was then prepared with the dextran obtained, 20 litres of this dextran solution were charged into a vessel equipped with a stirring system. 200 g. of sodium borohydride was then added a little at a time. The mixture was allowed to stand, with occasional shaking. After 6 hours, the solution was acidified with acetic acid and de-ionised with an ion exchange resin. Hydrodextran was precipitated with methyl alcohol, giving approximately 3 kg. having the following characteristics: reducing power against Somogyi reagent, practically none; rotatory power (alpha)=+170°; intrinsic viscosity 0.05.

This hydrodextran was then sulphonated. 3 kg. of $SO_3$ was added a little at a time to 8 kg. of pyridine cooled to −10° C. whilst stirring, and the temperature was maintained below 0° C. 1.6 kg. of hydrodextran were added after raising the temperature to between 25 and 30° C. The exothermicity of the mixture raised the temperature which was then maintained at between 65 and 75° C. for 8 to 10 hours. The solution was cooled and neutralized by adding 4.9 kg. of 70% (by volume) caustic potash. The solution was then allowed to stand, thereby decanting the greater proportion of the pyridine. The dense material left at the bottom was dissolved in water and dialyzed whilst maintaining a slightly alkaline pH value. Concentration and then precipitation were performed, the latter by means of acetone to obtain a viscous liquid which, after desiccation yielded 2.8 kg. of the potassium salt of sulphated hydrodextran.

The physico-chemical characteristics of the product are:

Ash content—42.6%
Hydrodextran—40.9%
Sulphur—16.5%
Rotatory power (alpha)—+83°
Quantity whose reducing power is equivalent to 50 mg. of glucose—82.1 g.
Intrinsic viscosity—0.04

To demonstrate the action of salts of sulphated hydrodextran on the metabolism of blood lipids, experimental tests were carried out on laboratory animals (rabbits) which were fed on a high cholesterol diet and treated with a dosage of 5 mg./kg. of body weight. The evaluation of the antilipaemic activity was made on the basis of deter- the cholesterol, the total lipoids and the beta-alpha lipoprotein quotient in all animals prior to starting the tests, and at subsequent dates following the tests, between 30 and 94 days, and identical checks were performed on test animals which merely received the cholesterol diet.

The results of the tests demonstrated a reduction in the cholesterol values, total lipoid number and beta/alpha quotient, testifying to the antilipaemic action of the salts of sulphated hydrodextran, the lipoid values approximating physiological figures, in comparison with the results of the control groups demonstrating the effects of experimental hyperlipaemia.

At the end of the tests, all the animals were dispatched for comparative study of the weight of the liver, liver fat and liver fat cholesterol, and the results demonstrated the stimulating action of the product on the metabolism of the lipoids, lower values being found in the weight, triglycerides and cholesterol in the liver fat of the animals treated, compared to the controls. Accordingly, the salts of sulphate hydrodextran operate to stimulate the metabolism of the lipoids and to reduce the figures for cholesterol, the total number of lipoids and beta-alpha lipoprotein quotient.

The proteinogram was also established for the experimental animals, and was found to be normal throughout the experimental period. The period of coagulation was also verified, and did not vary.

Consequently, the beneficial action of the salts of sulphated hydrodextran can be confirmed on the figures for cholesterol, total number of lipoids and beta/alpha quotient, which tends to balance the hyperlipaemic increments obtained experimentally with special diets based on fats and cholesterol liable to cause experimental atherosclerosis.

The salts of sulphated hydrodextran may, of course, be used in association with conventional pharmaceutical carriers or diluents and may be administered by any convenient route, although, as stated, they are particularly suitable for administration by the oral route.

What we claim is:

1. An antilipaemic sulphated polysaccharide active under oral administration, which consists of a potassium or sodium salt of a sulphated hydrodextran, with an average content of from 1 to 3 —$SO_3$— groups per monosaccharide group and being essentially non-reducing as determined by the Somogyi method.

2. An antilipaemic sulphated polysaccharide as claimed in claim 1, having an aintrinsic viscosity of between 0.02 and 0.07 at 25° C.

3. An antilipaemic sulphated polysaccharide as claimed in claim 1, which is a salt of sulphated hydrodextran and contains a proportion of sulphur of from 10 to 20% by weight.

4. An antilipaemic sulphated polysaccharide active under oral administration, which consists of a potassium or sodium salt of a sulphated hydrodextran, with an average content of from 1 to 3 —$SO_3$— groups per monosaccharide group and being essentially non-reducing as determined by the Somogyi method, has an intrinsic viscosity of between 0.02 and 0.07 at 25° C. and contains a proportion of sulphur of from 10 to 20% by weight.

References Cited

UNITED STATES PATENTS

| | | | |
|---|---|---|---|
| 2,807,610 | 9/1957 | Zief et al. | 260—209D |
| 3,057,855 | 10/1962 | Smith et al. | 260—209D |
| 3,070,595 | 12/1962 | Petracek et al. | 260—209D |
| 3,075,965 | 1/1963 | Touey et al. | 260—234 |
| 3,141,014 | 7/1964 | Morii et al. | 260—234D |

LEWIS GOTTS, Primary Examiner

J. R. BROWN, Assistant Examiner

U.S. Cl. X.R.

260—209; 424—180